United States Patent Office — 3,303,145, Patented Feb. 7, 1967

3,303,145
FLUOROCARBON POLYETHERS
Dana Peter Carlson, Wilmington, Del., assignor to E. I. du Pont de Nemours and Company, Wilmington, Del., a corporation of Delaware
No Drawing. Filed Jan. 11, 1963, Ser. No. 250,750
3 Claims. (Cl. 260—2)

The present invention relates to novel fluorocarbon polyethers, and, more particularly, to fluorocarbon polyethers obtained by the polymerization of cyclic fluorocarbon epoxides.

In accordance with the present invention, it was discovered that cyclic fluorocarbon epoxides having the formula

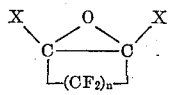

where $n$ is an integer from 2 to 4 inclusive, and X is either fluorine or chlorine can be polymerized to polyethers containing repeating units having the structure

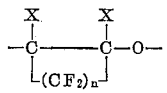

where X and $n$ have the meaning indicated above. The novel polyethers of the present invention also include copolymers of two or more cyclic fluoroolefin epoxides having the indicated structure as well as copolymers of such cyclic fluoroolefin epoxides with hexafluoropropylene epoxide.

The fluorocarbon polyethers of the present invention are prepared by polymerization in polar solvents. Suitable polar solvents are organic solvents, liquid at the polymerization temperature and capable of dissolving, i.e., to an extent of greater than 0.01 weight percent, perfluorocarbon alkoxides of alkali metals and specifically potassium perfluoropropoxide. The alkoxides can be formed by reaction of metal fluorides with perfluoroacyl fluorides. In particular, however, the preferred organic polar solvents are aliphatic polyethers having from 4 to 10 carbon atoms and hydrocarbon nitriles having from 2 to 10 carbon atoms, such as the dimethyl ether of ethylene glycol, the dimethyl ether of diethylene glycol, dioxane, propionitrile, benzonitrile and acetonitrile. Other highly polar solvents which meet the foregoing qualifications but which are not nitriles or polyethers include N-methyl pyrrolidone, nitroethane and tetrahydrofurane.

The catalysts suitable in the polymerization of the described fluorocarbon epoxides are monovalent metal fluorides, fluorocarbon alkoxides of alkali metals, quaternary ammonium salts and quaternary phosphonium salts. Tertiary amines may also be employed as catalysts in combination with solvents containing active hydrogen, however, it is believed that the tertiary amines from quaternary ammonium salts which cause the catalytic action observed with the amines. Similarly, the quaternary ammonium salt and phosphonium salt are believed to react with fluoride ions present in the reaction system and form quaternary ammonium and phosphonium fluorides which are believed to cause the catalytic action. Quaternary ammonium and phosphonium fluorides are the preferred salts since there is no need to form the fluoride in situ in order to obtain catalytic activity. The metal fluorides may be used as such or in admixture with other alkali metal halides. For example, mixtures of LiCl–CsF, LiCl–KF and LiBr–KF are frequently employed. The concentration of the catalyst is not critical and the preferred amount of catalyst is determined by the environment in which the reaction is conducted. In general, the concentration of the catalyst is at least 0.01% by weight of the cyclic fluorocarbon epoxide.

The degree of polymerization obtained in the process leading to the polyethers of the present invention will differ with the reaction temperature. An overall range of suitable temperatures is from −80 to 200° C. With decreasing temperatures, a higher molecular weight polyether is obtained. It will, of course, be realized that the product obtained at any specific reaction temperature will not comprise solely a polyether of a single degree of polymerization, but will comprise a range of polyethers differeing in their degree of polymerization. Pressures ranging from below atmospheric pressure to several hundred atmospheres have been employed and it has been established that pressure is not a critical factor in the process. Pressure is primarily employed for convenience depending on the physical state of the reactants at reaction conditions. The catalyst may be present either in solution or as a separate solid phase.

The cyclic fluorocarbon epoxide monomers employed to form the polyethers of the present invention are epoxides of cyclic fluoroolefins containing 4, 5, and 6 carbon atoms. The preparation of the fluorocarbon epoxide monomers is described in French Patent 1,262,507. In addition to fluorine, the ethers may also contain chlorine at the double bond; the remaining ring structure being perfluorinated. Thus, examples of the cyclic fluorocarbon epoxides polymerized to polyethers are perfluorocyclobutene epoxide, perfluorocyclopentene epoxide, perfluorocyclohexene epoxide, 1-chloroheptafluorocyclopentene-1,2-epoxide, 1,2-dichlorohexafluorocyclopentene-1,2-epoxide, and 1-chlorononafluorocyclohexene-1,2-epoxide.

The cyclic fluoroolefin epoxides can be homopolymerized or copolymerized with each other to liquid, semisolid and high molecular weight solid materials depending on the reaction conditions, the reaction medium, and the catalyst employed.

Analysis of the polyethers obtained by the homopolymerization of the cyclic fluoroolefin epoxide is consistent with the following structure

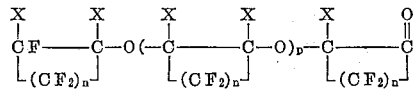

where X and $n$ have the indicated meaning, and $p$ is the number of repeating epoxide units in the polymer molecule.

As indicated above, the cyclic fluoroolefin epoxides can also be copolymerized with hexafluoropropylene epoxide. In this copolymerization, the end group have the following structures:

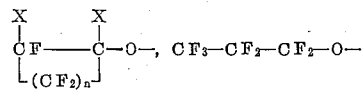

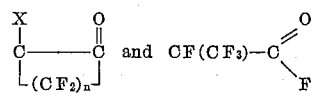

where X and $n$ have the indicated meaning.

The ratio of the cyclic fluoroolefin epoxide to the hexafluoropropylene epoxide in the copolymer can vary from very low concentrations, e.g., 1 to 2%, of one, to very low concentrations of the other and depends primarily on the concentrations in which the epoxides are employed. The same also applies where two or more cyclic fluoroolefin epoxides are copolymerized.

The invention is further illustrated by the following examples.

Example 1

Into a glass vessel is charged under nitrogen 5 g. of perfluorocyclopentene epoxide, 20 ml. of diethylene glycol dimethyl ether and 5 mg. of cesium fluoride. The vessel is sealed and heated at 100° C. for a period of one hour. On cooling, there is obtained 3.6 g. of a nonvolatile colorless oil having the chemical formula ($C_5F_8O$) which is insoluble in the reaction medium. Infrared and nuclear magnetic resonance spectra of this oil are consistent with the following structure

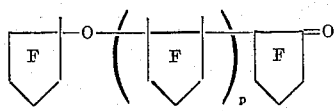

Example II

Into a glass vessel is charged 4 g. of perfluorocyclopentene epoxide, 15 ml. of diethylene glycol dimethyl ether and 0.1 g. of cesium fluoride. The mixture is agitated at 8 to 10° C. for 112 hours. A solid polyether of perfluorocyclopentene epoxide is formed in quantitative conversion. Being insoluble in the reaction medium the solid is isolated by filtration. The polyether has the structure indicated in Example I and a melting point at 134 to 138° C. The polyether could be compression molded into transparent films.

Example III

Example I is repeated using instead of 5 g. of perfluorocyclopentene epoxide a mixture of 4 g. of perfluorocyclopentene epoxide and 2 g. of hexafluoropropylene epoxide. The epoxides are converted in substantially quantitative amounts to a polyether containing both perfluorocyclopentene epoxide units and hexafluoropropylene epoxide units.

Example IV

Example I is repeated using 6 g. of perfluorocyclohexene epoxide instead of 5 g. of perfluorocyclopentene epoxide and 0.1 g. instead of 5 mg. of cesium fluoride. A liquid nonvolatile polyether of perfluorocyclohexene epoxide is obtained in substantially quantitative conversion.

Example V

Example IV is repeated using 4 g. of perfluorocyclobutene epoxide instead of 6 g. of perfluorocyclohexene epoxide. A liquid polyether of perfluorocyclobutene epoxide is obtained in substantially quantitative conversion.

Example VI

Into a glass vessel is charged 4.0 g. of perfluorocyclopentene epoxide, 15 ml. of diethyl ether and 14 mg. of cesium fluoride. The mixture is agitated for 66 hours at room temperature. A small amount of solid insoluble polyether of perfluorocyclopentene epoxide is obtained.

Example VII

Example VI is repeated except that tetrahydrofurane is employed as the reaction medium. There is obtained 3.8 g. of a sticky solid which was identified as a polyether of perfluorocyclopentene epoxide.

Example VIII

Into a glass vessel is charged 5.4 g. of 1-chloroheptafluorocyclopentene-1,2-epoxide, 20 ml. of diethylene glycol dimethylene ether, and 0.5 g. of cesium fluoride. The mixture is stirred vigorously for 3.75 hours at 0° C. and results in the formation of 3.3 g. of a nonvolatile, mobile oil which was identified as a polyether of 1-chloroperfluorocyclopentene-1,2-epoxide.

Example IX

Following the procedure of Example VIII 1,2-chlorohexafluorocyclopentene-1,2-epoxide is polymerized to a liquid, nonvolatile polyether.

Example X

Following the procedure of Example VIII a mixture of 1-chloroperfluorocyclopentene-1,2-epoxide is copolymerized with perfluorocyclopentene epoxide to result in a liquid polyether containing units derived from both monomers.

The fluoroolefin epoxides employed in the formation of the polyethers of the present invention are obtained by the epoxidation of the corresponding fluoroolefin using aqueous alkaline hydrogen peroxide.

The utility of the polyethers of the present invention depends on their molecular weight although all of the polyethers are characterized by their outstanding thermal stability, chemical inertness and dielectric properties. Thus, the low molecular weight polyethers are useful as solvents and heat-transfer media, the medium molecular weight polymers as lubricants, and the high molecular weight solid polymers as insulators in the form of films and moldings.

I claim:

1. A linear polyether containing structural units having the formula:

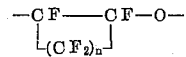

where $n$ is an integer from 2 to 4 inclusive said polyethers being obtained by the polymerization of an epoxide having the general formula:

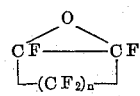

and mixtures of the said epoxide with hexafluoropropylene epoxide.

2. A polyether having the formula:

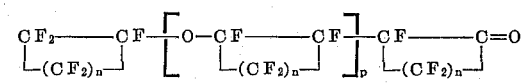

wherein $n$ is an integer from 2 to 4 inclusive and $p$ is an integer.

3. A linear polyether obtained by the copolymerization of hexafluoropropylene epoxide and a cyclic fluoroolefin epoxide having the formula:

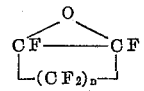

where $n$ is an integer from 2 to 4 inclusive.

References Cited by the Examiner
UNITED STATES PATENTS 2,736,730  2/1956  Kleiman _____ 260—348
3,030,315  4/1962  Bailey _____ 260—2

OTHER REFERENCES

Smith et al.: "Fluorine-Containing Polyethers," Industrial and Engineering Chemistry, vol. 49, No. 8, pp. 1241–1246.

WILLIAM H. SHORT, *Primary Examiner.*

S. N. RICE, *Assistant Examiner.*